United States Patent
Choi

(10) Patent No.: US 10,569,825 B2
(45) Date of Patent: Feb. 25, 2020

(54) BICYCLE HAVING WHEEL HEIGHT ADJUSTMENT STRUCTURE

(71) Applicants: HYUNDAI MOTOR COMPANY, Seoul (KR); KIA MOTORS CORPORATION, Seoul (KR)

(72) Inventor: Jungnam Choi, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 163 days.

(21) Appl. No.: 15/823,183

(22) Filed: Nov. 27, 2017

(65) Prior Publication Data

US 2018/0170477 A1 Jun. 21, 2018

(30) Foreign Application Priority Data

Dec. 16, 2016 (KR) .................. 10-2016-0172966

(51) Int. Cl.
| | |
|---|---|
| *B62K 25/28* | (2006.01) |
| *B62K 25/02* | (2006.01) |
| *B62K 25/04* | (2006.01) |

(52) U.S. Cl.
CPC ............ *B62K 25/28* (2013.01); *B62K 25/02* (2013.01); *B60G 2500/324* (2013.01); *B62K 2025/045* (2013.01)

(58) Field of Classification Search
None
See application file for complete search history.

(56) References Cited

U.S. PATENT DOCUMENTS

| 3,226,132 A * | 12/1965 | Otani ................... B62J 7/02 |
| | | 280/281.1 |
| 5,011,172 A * | 4/1991 | Bellanca ............ B62K 19/02 |
| | | 264/258 |
| 6,688,626 B2 * | 2/2004 | Felsl ................. B62K 25/04 |
| | | 267/124 |
| 7,255,359 B2 | 8/2007 | Felsl |
| 8,899,606 B2 | 12/2014 | Cocalis |
| 9,415,828 B2 * | 8/2016 | Norstad ............. B62K 19/24 |
| 10,131,405 B2 * | 11/2018 | Fukao ............... B62M 25/04 |
| 2017/0151996 A1 * | 6/2017 | Southall ............. B62K 25/04 |
| 2018/0079462 A1 * | 3/2018 | Shirai ................ B62K 25/08 |

FOREIGN PATENT DOCUMENTS

| KR | 20080021096 | * | 3/2008 | ........... B62K 21/02 |
| KR | 10-2016-0045046 A | | 4/2016 | |

OTHER PUBLICATIONS

English Translation of KR20080021096 (Year: 2008).*

* cited by examiner

*Primary Examiner* — Kevin Hurley
*Assistant Examiner* — Harold Eric Pahlck, III
(74) *Attorney, Agent, or Firm* — McDonnell Boehnen Hulbert & Berghoff LLP

(57) ABSTRACT

A bicycle having a wheel height adjustment structure according to an exemplary embodiment of the present invention includes: a bicycle frame; a hanger where a dropout is formed and rotatably coupled to one side of the frame with respect to a hinge; and an adjusting portion that adjusts a height of the wheel that is engaged to the dropout by rotating the hanger at a predetermined angle.

11 Claims, 7 Drawing Sheets

BICYCLE HAVING WHEEL HEIGHT ADJUSTMENT STRUCTURE

CROSS-REFERENCE TO RELATED APPLICATION

This application claims priority to and the benefit of Korean Patent Application No. 10-2016-0172966 filed in the Korean Intellectual Property Office on Dec. 16, 2016, the entire contents of which are incorporated herein by reference.

BACKGROUND OF THE INVENTION (a) Field of the Invention

The present invention relates to a bicycle having a wheel height adjustment structure for improvement of safety in riding up or down a slope by adjusting the height of a rear wheel according to the intention of a bicycle rider.

(b) Description of the Related Art

In general, a bicycle frame is formed of a head tube, a sheet tube, a top tube, a down tube, a sheet stay, and a chain stay.

The head tube is connected with a connection body of a steering handle through an upper end of the head tube and a front wheel rotation connection body through a bottom end of the head tube, and the sheet tube is connected with a saddle connection body through an upper end of the sheet tube and a chain driving body through a bottom end of the sheet tube.

The top tube and the down tube support the head tube and the sheet tube by connecting the head tube and the sheet tube, and the sheet stay and the chain stay support a rear wheel rotation connection body and the sheet tube by connecting the rear wheel rotation connection body and the sheet tube.

The bicycle frame is usually equipped with the top tube and the down tube, but a main tube (not shown) may be connected between the head tube and the sheet tube as necessary.

A typical bicycle frame is formed by respectively cutting a tube into a top tube, a down tube, and a sheet tube and welding the respective tubes. However, the manufacturing process cannot be automated, thereby deteriorating productivity and causing an increase of manufacturing cost.

Recently, a process for manufacturing a bicycle frame by stamping a panel and bonding the stamped panel at the left and right thereof has been researched and developed to thereby improve production efficiency and durability.

When a bicycle rider brakes the bicycle, the center of gravity of the bicycle moves forward so that a rollover accident may occur, and when the rider is riding the bicycle on an uphill road, the center of gravity of the bicycle moves rearward and thus a front wheel is lifted from the ground, thereby reducing a grip force of the wheel.

The above information disclosed in this Background section is only for enhancement of understanding of the background of the invention and therefore it may contain information that does not form the prior art that is already known in this country to a person of ordinary skill in the art.

PRIOR ART REFERENCE

Patent Reference

U.S. Pat. No. 8,899,606B2

SUMMARY OF THE INVENTION

The present invention has been made in an effort to provide a bicycle having a wheel height adjustment structure that can reduce a rollover accident due to nose-down when a front wheel is braked on a downhill road or a flat road and prevent a front wheel from being lifted when the center of gravity of the bicycle moves to the rear on an uphill road.

A bicycle having a wheel height adjustment structure according to an exemplary embodiment of the present invention includes: a bicycle frame; a hanger where a dropout is formed and rotatably coupled to one side of the frame with respect to a hinge; and an adjusting portion that adjusts a height of the wheel that is engaged to the dropout by rotating the hanger at a predetermined angle.

The bicycle having the wheel height adjustment structure may further include an elastic member that elastically supports the hanger such that the hanger rotates back to its original location with respect to the hinge.

The bicycle having the wheel height adjustment structure may include a fixing bracket fixed to one side of the frame, wherein the hanger may be mounted to the fixing bracket through the hinge.

The adjusting portion may include: a lever; and a wire that connects the lever and the hanger for rotation of the hanger with respect to the hinge by pulling or pushing the hanger according to the adjustment of the lever.

A guide may be provided protruding from the fixing bracket, and the wire may be connected with the hanger by penetrating the guide.

The adjusting portion may include: a lever; and a hydraulic cylinder that is provided to rotate the hanger by using a hydraulic pressure that is supplied according to operation of the lever.

The hydraulic pressure cylinder may include: a housing connected to the frame; and a piston of which a rear end is inserted into the housing and a front end pulls or pushes the hanger according to a supplied hydraulic pressure.

The adjusting portion may further include a hydraulic pressure transmission line that transmits a hydraulic pressure by connecting the lever and the hydraulic pressure cylinder.

An axle of a rear wheel may be engaged with the dropout of the hanger by being inserted therein.

The frame may include a chain stay and a sheet stay, and the hanger is engaged to a portion where the chain stay and the sheet stay are connected with each other.

The chain stay and the sheet stay may be respectively formed of a single pipe member.

The chain stay and the sheet stay may be formed in the shape of a pipe by molding two panels and bonding the two molded panels to each other.

The housing may be connected with the frame through a pin, and a front end of the piston may be connected with the hanger through a pin.

The wire may be connected with an upper portion of the hanger with respect to the hinge, and the elastic member may be connected with a lower portion of the hanger with respect to the hinge.

A wheel adjustment structure according to an exemplary embodiment of the present invention includes: a hanger that is provided to be rotatable with respect to a hinge and includes a dropout formed in one side thereof; and an adjusting portion that adjusts a height of the dropout by rotating the hanger at a predetermined angle with respect to the hinge.

The adjusting portion may adjust a rotation angle of the hanger by pulling or pushing a wire connected to one side of the hanger.

The adjusting portion may adjust a rotation angle of the hanger by pulling or pushing the hanger using a hydraulic pressure.

According to the exemplary embodiments of the present invention, the height of the rear wheel can be adjusted depending on a riding condition of the bicycle so that the bicycle can be prevented from rolling over due to nose-down when a front wheel is braked on a downhill road or a flat road and the front wheel can be prevented from being lifted when the center of gravity of the bicycle moves to the rear on an uphill road.

DESCRIPTION OF SYMBOLS

Figure 1:
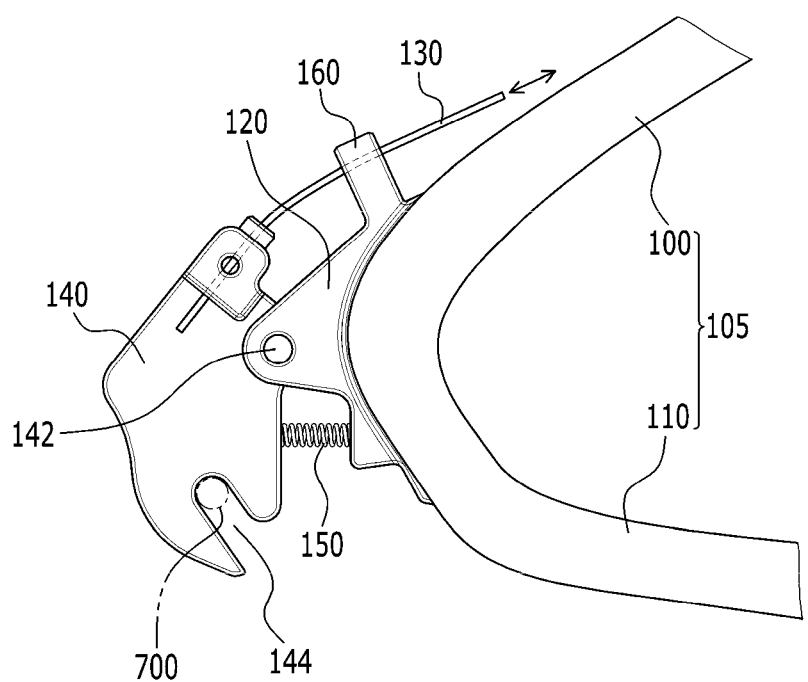
FIG. 1 is a partial side view of a bicycle having a wheel height adjustment structure according to an exemplary embodiment of the present invention.

| | |
|---|---|
| 100: sheet stay | 110: chain stay |
| 105: bicycle frame | 130: wire |
| 160: guide | 120: fixing bracket |
| 142: hinge | 140: hanger |
| 144: dropout | 150: elastic member |
| 300: hydraulic pressure cylinder | 500: cylinder housing |
| 510: piston | 520: hydraulic pressure transmission line |
| 600: lever | |

DETAILED DESCRIPTION OF THE EMBODIMENTS

Hereinafter, an exemplary embodiment of the present invention will be described in detail with reference to the accompanying drawings.

Since sizes and thicknesses of each component illustrated in the drawings are arbitrarily represented for convenience in explanation, the present invention is not particularly limited to the illustrated sizes and thicknesses of each component, and the sizes and thicknesses are enlarged in order to clearly explain various parts and areas.

Furthermore, the size and thickness of each of elements illustrated in the drawings are arbitrarily illustrated for ease of description, and the present invention is not limited thereto. In the drawings, the thicknesses of parts and regions have been enlarged for clarity.

In addition, in the following detailed description, terms such as first and second are used to distinguish between elements when the first and second elements have the same construction, and the elements are not limited to such order in the following description.

FIG. 1 is a partial side view of a bicycle having a wheel height adjustment structure according to an exemplary embodiment of the present invention.

Referring to FIG. 1, a bicycle having a wheel height adjustment device includes a bicycle frame 105, a fixing bracket 120, a guide 160, a wire 130, a hanger 140, a hinge 142 where a dropout 144 is formed, and an elastic member 150, and the bicycle frame 105 includes a sheet stay 100 and a chain stay 110.

The fixing bracket 120 is provided in a portion where the sheet stay 100 and the chain stay 110 meet, and the hanger 140 is mounted to the fixing bracket 120 through the hinge 142. In addition, the hanger 140 is rotatable in a clockwise or counterclockwise direction with respect to the hinge 142.

The dropout 144 into which an axle 700 is inserted is provided in a lower portion of the hander 140, and an upper portion of the hanger 140 is connected with the wire 130. Here, the wire 130 is connected with the upper portion of the hanger 140 by penetrating the guide 160, and the guide 160 protrudes from an upper portion of the fixing bracket 120.

The elastic member 150 is provided between the hanger 140 and the fixing bracket 120 to elastically support the hanger 140.

When a rider operates a lever provided in the bicycle frame 105, the lever pulls or pushes the wire 130.

In the exemplary embodiment of the present invention, the sheet stay 100 and the chain stay 110 may be respectively provided as separate parts and then bonded to each other, or may be provided as a single pipe member. Further, the sheet stay 100 and the chain stay 110 are molded by respectively stamping two panels and then bonded to each other along a length direction thereof, thereby forming a single pipe shape.

In FIG. 1, the hanger 140 is mounted to the frame 105 through the bracket 120, but this is not restrictive. The hanger 140 may be directly engaged to the frame 105. Here, the elastic member 150 may be directly engaged to the frame.

Figure 2:
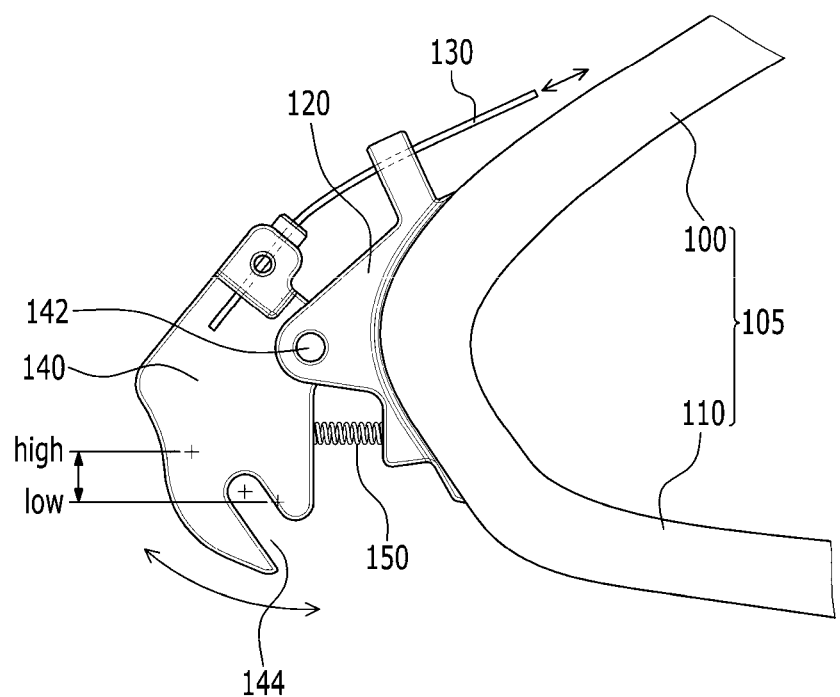
FIG. 2 is a partial side view of a state in which the wheel adjustment device according to the exemplary embodiment of the present invention operates.

FIG. 2 is a partial side view illustrating a state in which the wheel height adjustment device according to the exemplary embodiment of the present invention operates.

Referring to FIG. 2, when the wire 130 pulls an upper portion of the hanger 140, the hanger 140 rotates clockwise with respect to the hinge 142, and then the dropout 144 is lifted and accordingly a rear wheel (not shown) is lifted.

In addition, when the wire 130 pushes the upper portion of the hanger 140, the hanger 140 rotates counterclockwise with respect to the hinge 142, and thus the dropout 144 is lowered and accordingly the rear wheel is lowered.

When the wire 130 does not move, the elastic member 150 may maintain a rotation location of the hanger 140 by elastically pulling or pushing a lower portion of the hanger 140. The elastic member 150 may absorb impact applied to the hanger 140.

Figure 3:
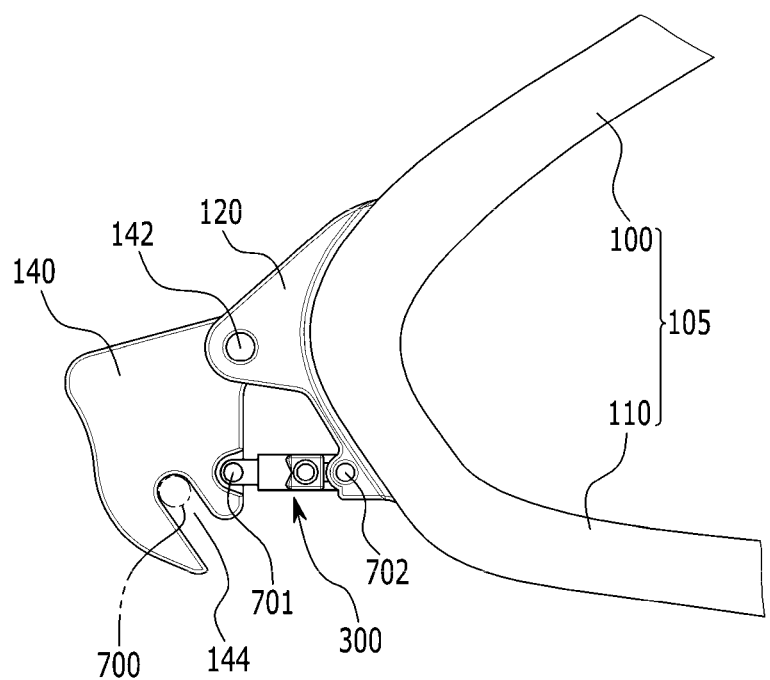
FIG. 3 is a partial side view of a bicycle having a wheel height adjustment device according to another exemplary embodiment of the present invention.

FIG. 3 is a partial side view of a bicycle having a wheel height adjustment device according to another exemplary embodiment of the present invention.

In description of the wheel height adjustment device shown in FIG. 3, components that are the same as those of the wheel height adjustment device of FIG. 1 and FIG. 2 will be described by using the same reference numerals for convenience of understanding.

Referring to FIG. 3, a bicycle having a wheel height adjustment device includes a bicycle frame 105, a fixing bracket 120, a hanger 140 where a dropout 144 is formed, a hinge 142, and a hydraulic pressure cylinder 300, and the bicycle frame 105 includes a sheet stay 100 and a chain stay 110.

In the bicycle frame 105, the fixing bracket 120 is provided in a portion where the sheet stay 100 and the chain stay 110 meet, and the hanger 140 is mounted to the fixing bracket 120 through the hinge 142. In addition, the hanger 140 is rotatable in a clockwise or counterclockwise direction with respect to the hinge 142.

The dropout 144 into which an axle 700 is inserted is provided in a lower portion of the hanger 140, one end of the hydraulic pressure cylinder 300 is connected with a lower portion of the hanger 140 through a pin 701, and the other end of the hydraulic pressure cylinder 300 is connected with the fixing bracket 120 through a pin 702.

For example, a lever that controls to supply or release a hydraulic pressure to or from the hydraulic pressure cylinder 300 may be mounted to the bicycle frame 105, and when the lever operates, the hydraulic pressure is supplied to the hydraulic pressure cylinder 300 to control the hanger 140 to rotate clockwise or counterclockwise with respect to the hinge 142.

In FIG. 3, the hanger 140 is mounted to the bicycle frame 105 through the bracket 120, but this is not restrictive. The hanger 140 may be directly engaged to the frame 105. Here, the hydraulic chamber 300 may be directly engaged to the frame 105.

Figure 4:
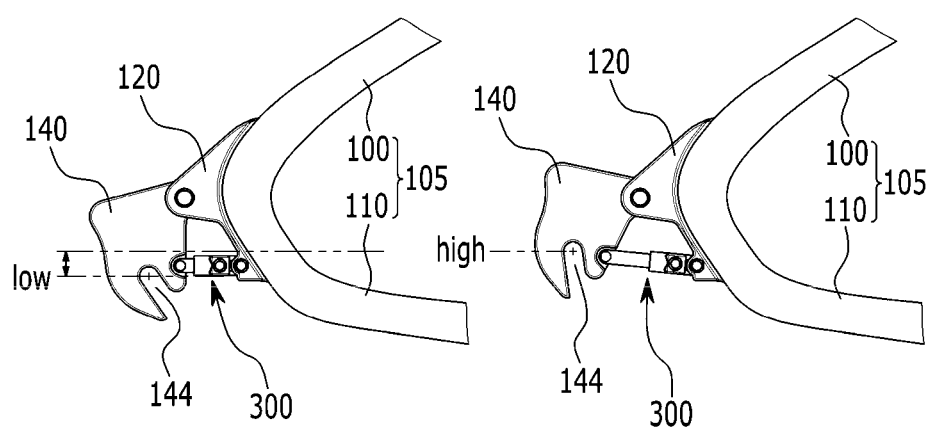
FIG. 4 is a partial side view of a state in which the bicycle having the wheel height adjustment device according to the other exemplary embodiment of the present invention operates.

FIG. 4 is a partial side view of a state in which the wheel height adjustment device according to the other exemplary embodiment of the present invention operates.

Referring to FIG. 4, when a hydraulic pressure is supplied to the hydraulic pressure cylinder 300, the hanger 140 rotates clockwise with respect to the hinge 142, and then the dropout 144 is lifted so that a rear wheel is lifted.

In addition, when the hydraulic pressure is released from the hydraulic pressure cylinder 300, the hanger 140 rotates counterclockwise, and then the dropout 144 is lowered so that the rear wheel is lowered.

In the present exemplary embodiment, the hydraulic pressure cylinder 300 is disposed in the lower portion of the hinge 142, but this is not restrictive. The hydraulic pressure cylinder 300 may be disposed in an upper portion of the hinge 142.

Figure 5:
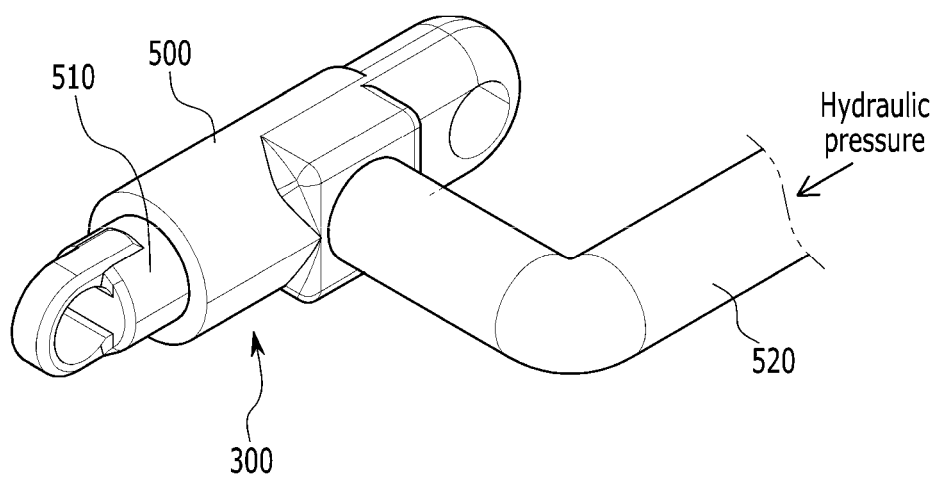
FIG. 5 is a perspective view of a hydraulic pressure cylinder in the wheel height adjustment device according to the other exemplary embodiment of the present invention.

FIG. 5 is a perspective view of the hydraulic pressure cylinder in the wheel height adjustment device according to the present exemplary embodiment.

Referring to FIG. 5, the hydraulic pressure cylinder 300 includes a piston 510 and a cylinder housing 500, and a hydraulic pressure transmission line 520 is connected with a side surface of the cylinder housing 500.

A rear end of the piston 510 is inserted into the cylinder housing 500 and a front end thereof is connected with a lower portion of the hanger 140 through a pin, and a rear end of the cylinder housing 500 is connected with the fixing bracket 120 through a pin.

Figure 6:
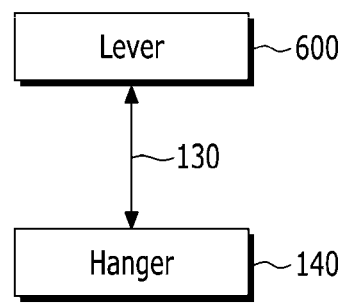
FIG. 6 and FIG. 7 are schematic diagrams of a wheel adjustment device according to an exemplary embodiment of the present invention.
Figure 7:
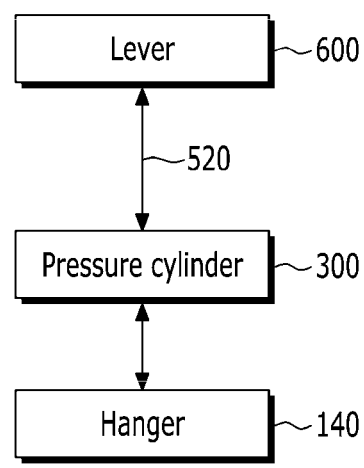

FIG. 6 and FIG. 7 are schematic diagrams of a wheel height adjustment device according to an exemplary embodiment of the present invention.

Referring to FIG. 6, a wheel height adjustment device includes a lever 600, a wire 130, and a hanger 140, and the lever 600 can adjust a rotation location of the hanger 140 through the wire 130.

Referring to FIG. 7, the wheel height adjustment device includes the lever 600, a hydraulic pressure transmission line 520, a hydraulic pressure cylinder 300, and a hanger 140, the lever 600 transmits a hydraulic pressure to the hydraulic pressure cylinder 300 through the hydraulic pressure transmission line 520, and the hydraulic pressure cylinder 300 controls a rotation location of the hanger 140.

In the present exemplary embodiment, a structure in which the lever 600 pulls or pushes the wire 130 and a structure in which the lever 600 supplies a hydraulic pressure to the hydraulic pressure cylinder 300 refer to the known technology, and therefore the description thereof will be omitted.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A bicycle having a wheel height adjustment structure, comprising:
   a bicycle frame;
   a hanger where a dropout is formed and rotatably coupled to one side of the frame with respect to a hinge;
   an adjusting portion that adjusts a height of the wheel that is engaged to the dropout by rotating the hanger at a predetermined angle, the adjusting portion comprising a lever and a wire that connects the lever and the hanger for rotation of the hanger with respect to the hinge by pulling or pushing the hanger according to the adjustment of the lever;
   an elastic member that elastically supports the hanger such that the hanger rotates back to its original location with respect to the hinge; and
   a fixing bracket fixed to one side of the frame, wherein the hanger is mounted to the fixing bracket through the hinge.

2. The bicycle having the wheel height adjustment structure of claim 1, wherein a guide is provided protruding from the fixing bracket, and the wire is connected with the hanger by penetrating the guide.

3. A bicycle having a wheel height adjustment structure, comprising:
   a bicycle frame;
   a hanger where a dropout is formed and rotatably coupled to one side of the frame with respect to a hinge; and
   an adjusting portion that adjusts a height of the wheel that is engaged to the dropout by rotating the hanger at a predetermined angle,
   wherein the adjusting portion comprises:
   a lever; and
   a hydraulic cylinder that is provided to rotate the hanger by using a hydraulic pressure that is supplied according to operation of the lever; and
   wherein the adjusting portion further comprises a hydraulic pressure transmission line that transmits a hydraulic pressure by connecting the lever and the hydraulic pressure cylinder.

4. The bicycle having the wheel height adjustment structure of claim 3, wherein the hydraulic pressure cylinder comprises:
   a housing connected to the frame; and
   a piston of which a rear end is inserted into the housing and a front end pulls or pushes the hanger according to a supplied hydraulic pressure.

5. The bicycle having the wheel height adjustment structure of claim 1, wherein an axle of a rear wheel is engaged with the dropout of the hanger by being inserted therein.

6. The bicycle having the wheel height adjustment structure of claim 5, wherein the frame comprises a chain stay and a sheet stay, and the hanger is engaged to a portion where the chain stay and the sheet stay are connected with each other.

7. The bicycle having the wheel height adjustment structure of claim 6, wherein the chain stay and the sheet stay are respectively formed of a single pipe member.

8. The bicycle having the wheel height adjustment structure of claim 6, wherein the chain stay and the sheet stay are formed in the shape of a pipe by molding two panels and bonding the two molded panels to each other.

9. The bicycle having the wheel height adjustment structure of claim 4, wherein the housing is connected with the frame through a pin, and a front end of the piston is connected with the hanger through a pin.

10. The bicycle having the wheel height adjustment structure of claim 1, wherein the wire is connected with an upper portion of the hanger with respect to the hinge, and the elastic member is connected with a lower portion of the hanger with respect to the hinge.

11. A wheel adjustment structure comprising:
a hanger that is provided to be rotatable with respect to a hinge and includes a dropout formed in one side thereof; and
an adjusting portion that adjusts a height of the dropout by rotating the hanger at a predetermined angle with respect to the hinge, wherein the adjusting portion adjusts a rotation angle of the hanger by pulling or pushing a wire connected to one side of the hanger.

* * * * *